United States Patent
Kiiski et al.

(10) Patent No.: US 6,430,421 B1
(45) Date of Patent: Aug. 6, 2002

(54) ADAPTIVE RADIO SYSTEM

(75) Inventors: Matti Kiiski; Ilkka Keskitalo, both of Oulu (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/506,857

(22) Filed: Feb. 17, 2000

Related U.S. Application Data (63) Continuation of application No. PCT/FI98/00643, filed on Aug. 21, 1998.

(30) Foreign Application Priority Data

Aug. 22, 1997 (FI) .................................................. 973478

(51) Int. Cl.$^7$ ............................................... H04Q 7/20
(52) U.S. Cl. ...................... 455/562; 455/73; 455/277.1; 455/277.2; 455/279.1
(58) Field of Search ................................. 455/562, 452, 455/561, 73, 277.1, 277.2, 279.1

(56) References Cited

U.S. PATENT DOCUMENTS

| | | | |
|---|---|---|---|
| 5,203,027 A | | 4/1993 | Nounin et al. |
| 5,297,168 A | | 3/1994 | Sant'Agostino et al. |
| 5,742,911 A | * | 4/1998 | Dumbrill et al. ........... 455/562 |
| 5,771,017 A | * | 6/1998 | Dean et al. ................. 342/374 |
| 5,806,001 A | * | 9/1998 | Yokota ........................ 455/507 |
| 5,848,361 A | * | 12/1998 | Edwards ...................... 455/562 |
| 5,854,986 A | * | 12/1998 | Dorren et al. .............. 455/562 |

FOREIGN PATENT DOCUMENTS

| | | |
|---|---|---|
| EP | 0 647 980 | 4/1995 |
| EP | 0 741 466 | 11/1996 |
| GB | 2 294 609 | 5/1996 |
| JP | 08274687 | 10/1996 |

OTHER PUBLICATIONS

International Search Report for PCT/FI98/00643.
"The GSM System for Mobile Communications" Mouly, et al., 1992.

* cited by examiner

Primary Examiner—Daniel Hunter
Assistant Examiner—Alan T. Gantt
(74) Attorney, Agent, or Firm—Altera Law Group, LLC (57) ABSTRACT

The invention relates to an adaptive radio system that includes a plurality of mobile stations and at least one base station. In the radio system, at least the base station includes a plurality of independent transmitting and receiving branches to transfer signals between the base station and mobile stations. The radio system is according to the invention characterized in that it additionally includes means (401, 402) for connecting said transmitting branches and receiving branches in parallel and for numerical, dynamic assigning thereof to transfer of a single signal. The invention further relates to a method for assigning transmitting and receiving branches in a radio system.

18 Claims, 8 Drawing Sheets

ADAPTIVE RADIO SYSTEM

CROSS-REFERENCE TO RELATED APPLICATION

This patent is a continuation of PCT/FI98/00643 which was filed on Aug. 21, 1998, and claims priority of Finland application 973478 filed on Aug. 22, 1997.

FIELD OF THE INVENTION

The invention relates to an adaptive radio system and a method for assigning transmitting and receiving branches in a radio system. The radio system comprises a plurality of mobile stations and at least one base station. In the radio system, at least the base station comprises a plurality of independent transmitting and receiving branches to transfer signals between the base station and the mobile stations.

BACKGROUND OF THE INVENTION

Figure 1:
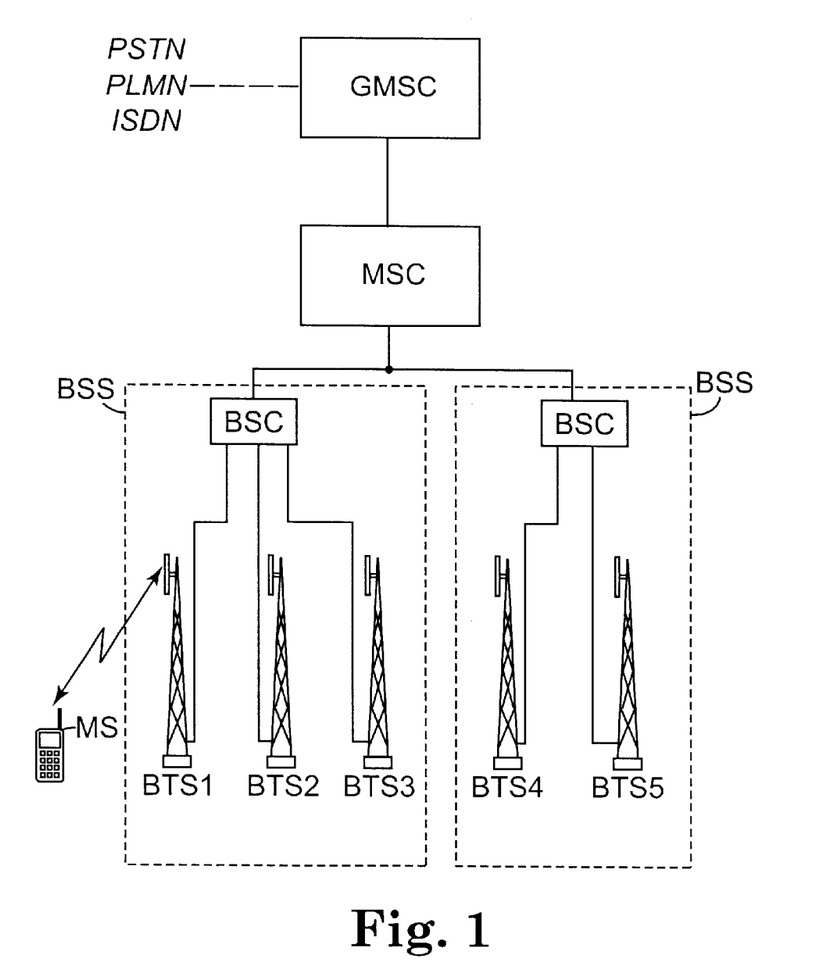
FIG. 1 shows the essential parts of a mobile communications system.

FIG. 1 in the accompanying drawing shows a simplified block diagram of the UMTS (Universal Mobile Telecommunication System). A mobile station (MS) communicates over the radio path with a base transceiver station (BTS), in the case of FIG. 1, with BTS1. The base station sub-system (BSS) consists of a base station controller (BSC) and base stations (BTS) under its control. A mobile services switching centre (MSC) usually controls a plurality of base station controllers BSC. The MSC communicates with other MSCs, and via a gateway mobile services switching centre (GMSC), the UMTS network is connected to other networks such as the public switched telephone network PSTN, another mobile communications network PLMN or an ISDN network ISDN. The mobile communications system shown by the figure is e.g. the pan-European GSM system or the UMTS system (Universal Mobile Telecommunication System). The GSM system is implemented with the TDMA technology (Time Division Multiple Access) and the UMTS system is proposed to be implemented with the time division multiple access technology (TDMA) or with the code division multiple access technology (CDMA) or a combination of these two, i.e. a so-called hybrid system.

In digital radio systems implemented with the TDMA technique, such as the GSM or the UMTS system, a group of mobile stations MS may, according to the time-division principle, use the same carrier frequency i.e. radio channel for communication with the base station BTS. The carrier is divided into successive frames that are further divided into timeslots, e.g. 8, 16 or 64 timeslots, that are allocated to users as required. From the network point of view, one carrier wave can consequently be used to establish e.g. 8, 16 or 64 traffic channels. In e.g. the GSM system, the channel width is 200 kHz and in the UMTS system 1.6 MHz, according to a proposal.

Code division multiple access CDMA radio systems are based on spread spectrum communication. The data signal to be transmitted is multiplied by a special hash code assigned to the subscriber, whereby the transmission spreads out onto the broadband radio channel, which is e.g. 1.25; 6.4 or 20 MHz. This means that the same broadband radio channel may be used by several users for simultaneous transmission of CDMA signals processed with different hash codes. Therefore, the unique hash code of each subscriber in CDMA systems produces the traffic channel of the system in the same sense as the timeslot does in TDMA systems. At the receiving end, the CDMA signal is despread by the subscriber's hash code, whereby a narrowband data signal is obtained. At the receiver, the other subscribers' broadband signals represent noise to the desired signal.

In radio systems, it is of prior art to use so-called SDMA technology (Space Division Multiple Access) employing adaptive antennas, in which subscribers can be distinguished on the basis of their geographical direction as seen from the base station, when e.g. antenna lobes are adjusted at the base station to desired directions according to the location of the mobile stations. Employing SDMA technology thus improves the signal to interference ratio C/I or the signal to noise ratio S/N of the radio connection between the base station BTS and the mobile station MS whereby the overall capacity of the system increases. SDMA technology further improves the frequency efficiency of the network as the transmission is beamed to a narrow geographical area, which means that the same frequency can be reused for another connection in another direction, possibly even at the same base station. Due to the antenna lobe aimed at the subscriber, the disturbing effects of multipath propagation on the radio link are reduced.

The SDMA technology is based on using a number of parallel receivers and transmitters on the same radio connection, e.g. for a base station transmission and reception, and signal processing that generally is performed digitally. The improvement in the signal to interference ratio and/or signal to noise ratio is usually the better the larger number of parallel transmitting and receiving branches are in use. So-called adaptive antennas, i.e. antennas having variable directional pattern, and processing of received signals are used to monitor mobile stations that communicate with the base station via a radio connection, for example by beaming the base station antenna lobe to a narrow geographical area with some prior art method, for example as regards CDMA systems, the antenna lobe can be beamed to the direction or directions from which the best signal components of the connection in question are received.

An adaptive antenna is comprised of an antenna array consisting of several antenna elements, the directional pattern of the antenna array being dynamically changed by phasing the signals of the antenna elements. Such an antenna array may consist of omnidirectional or directional antenna elements that may be arranged e.g. in a linear or planar manner. Signals arriving from outside the main lobe of an adaptive directional antenna are attenuated in proportion determined by the antenna directional pattern in relation to the signals received from main lobe. When adaptive antenna are utilized, the selected mobile station MS may transmit its signal at lower transmit power than normally due to the better antenna gain and signal processing at reception. The transmit and receive antennas may be separate, or the transmission and reception may be arranged to be carried out via a common antenna by separating the receiving and transmitting circuit from one another with a duplex filter.

Adaptive antennas contribute to lower level of interference due to the narrow antenna lobe as interference from other subscribers is reduced and interference caused to other subscribers is lower. Simultaneously, the coverage of the base station is increased towards the antenna main lobe. The antenna signal transmitted by a single mobile station MS can also be received via more than one antenna lobe, in which case signal components caused by e.g. multipath propagation can be combined or the signal from the mobile station, received at different antennas, can be processed in other ways, e.g. by weighting the received signals differently so that the signal is amplified in comparison to other signals that have been received. The directional pattern of an adaptive antenna can thus be changed by receiving a signal via more than one fixedly directed antenna lobes and by suitably weighting the signals thus received.

Figure 2A:
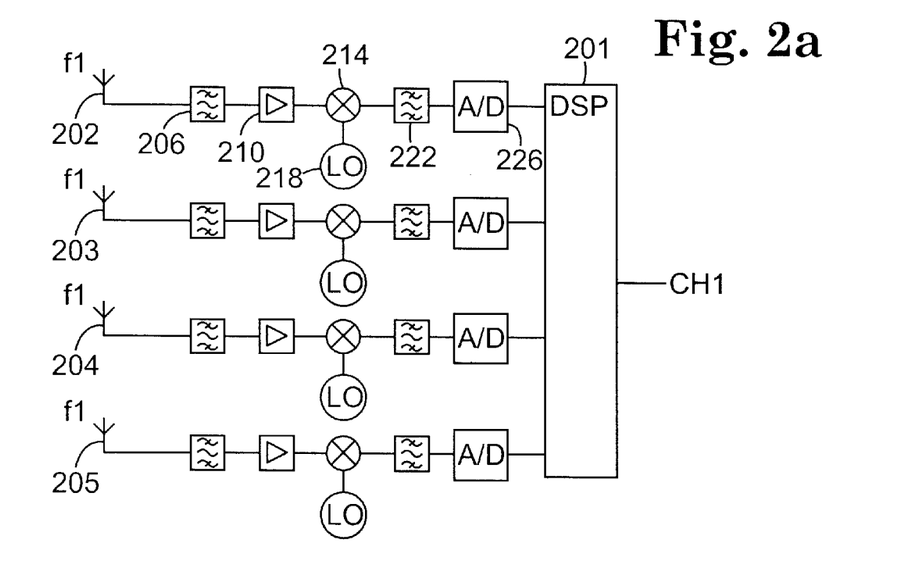
FIGS. 2a and 2b illustrate a block diagram of the receiving and transmitting sections of a prior art SDMA base station.
Figure 2B:
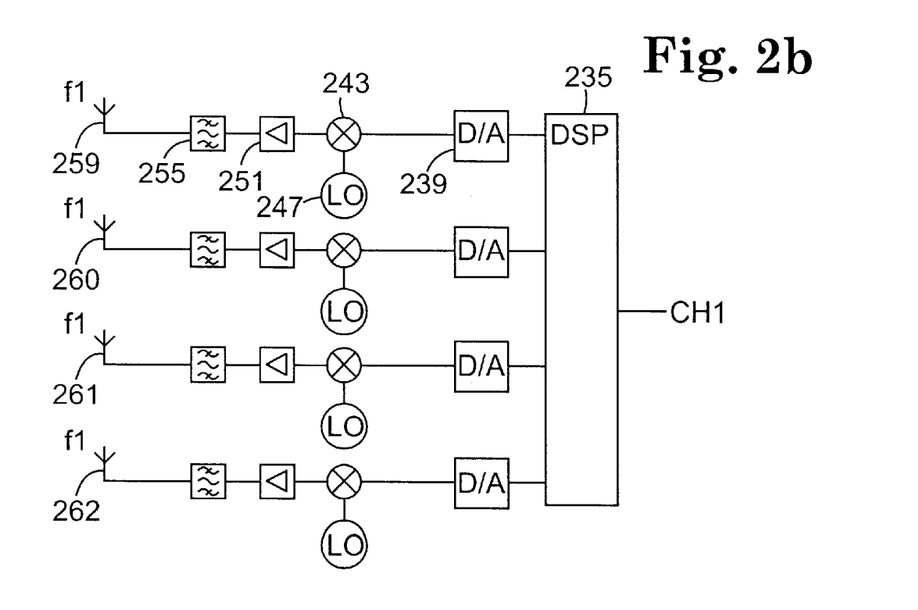

FIGS. 2a and 2b illustrate a block diagram for receiving and transmitting section of a base station employing SDMA technology. In the example of the figures, four parallel receiving and transmitting branches are tuned to the same channel CH1 and frequency f1. In the SDMA implementation, it is possible to set up as many parallel transmitting and receiving branches as the particular system requires. By increasing the number of transmitting and receiving branches set up in parallel, the antenna lobe can be directed to a narrower geographical area and at the same time to extend the coverage area further from the base station. FIG. 2a illustrates the structure of a base station consisting of four parallel receiving branches. In the block diagram of the receiving section in FIG. 2a, all four receiving branches have a common signal processing unit 201 in which the signals are processed as desired so that just one processed signal CH1 is conveyed from the signal processing unit 201 to other parts of the base station. The structure of one of the receiving branches of FIG. 2a is described more thoroughly in the following. The receiving branch receives a radio signal from the desired direction by means of antenna 202 on frequency f1. The received signal is conveyed to band-pass filter 206 and amplifier 210. Next, the signal is converted to a lower frequency in mixer 214 by multiplying it with the output frequency of local oscillator 218. The converted signal is conveyed via bandpass filter 222 to A/D converter 226 for conversion from analogue to digital form. The signal thus modified is conveyed to the common signal processing unit 201 of the receiving branches, in which it can be processed as desired. The structure of the other receiving branches of the base station is similar to that which has been described in the above.

FIG. 2b correspondingly illustrates the structure of a base station consisting of four transmitting branches. All four transmitting branches of FIG. 2b share a common signal processing unit 235 to which the transmitted signal CH1 is conveyed from other parts of the base station. The signal is processed in signal processing unit 235 as desired and the transmitted signal is conveyed to the four transmitting branches, of which the structure of one is described in more detail in the following. The transmitting branch comprises D/A converter 239 in which the signal is converted to analogue form. The analogue signal is conveyed to mixer 243 in which it is multiplied by the output frequency of local oscillator 247 and thus converted to the transmitted radio frequency, to frequency f1 in the case of FIG. 2b. The converted signal is conveyed to antenna 259 via amplifier 251 and band-pass filter 255. From the antenna, the signal is transmitted to the radio path. The structure of the other transmitting branches of the base station is similar to that which has been described in the above.

Figure 3:
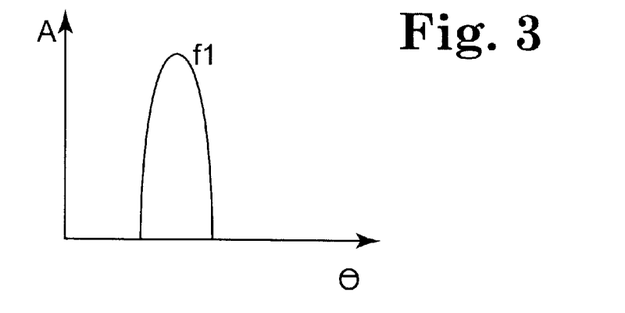
FIG. 3 shows the radiation pattern of the base station configuration according to FIGS. 2a and 2b, FIGS. 4a and 4b show a block diagram of the receiving and transmitting section of a base station in an adaptive radio system according to the preferred embodiment of the invention.

FIG. 3 shows the directional pattern of the antennas of the base station units disclosed above in FIGS. 2a and 2b. FIG. 3 shows the directional pattern for reception of the antenna array consisting of four antenna elements 202–205 of FIG. 2a, or the directional pattern for transmission from the antenna array consisting of four antenna elements 259–262 of FIG. 2b, so that the horizontal axis shows the azimuth Θ and the vertical axis shows amplitude A. The amplitude and beam width of the directional pattern depends on e.g. the number of antenna elements in the antenna, so that the more antenna elements there are in the antenna, the narrower is the beam and the higher the amplitude which is possible to obtain with the antenna to the main lobe's direction. Thus, the directional pattern of FIG. 3 shows a narrower beam width and higher amplitude towards the main radiation direction than the directional pattern of a single antenna element.

The problem with prior art systems employing adaptive antennas is that the combination of a plurality of parallel transmitters and receivers required for their maximum performance is expensive to implement and consequently only rarely worth while. In addition, efficient signal processing during normal load on the network is not always necessary, it just contributes to too good a connection to a limited set of mobile stations. The equipment required by SDMA applications are large, which means that they take up a lot of space at the installation site.

SUMMARY OF THE INVENTION

It is an objective of the present invention to implement an adaptive radio system in which as small as possible an equipment configuration can simultaneously offer good enough quality of service to as many subscribers as possible.

This object is achieved with a radio system of the type described in the preamble, which according to the invention is characterized by that which is disclosed in the independent claim 1. The particular embodiments of the invention are disclosed in the dependent claims.

The invention further relates to a method for assigning transmitting and receiving branches in a radio system which according to the invention is characterized by that which is claimed in the independent claim 7.

The invention is based on the idea that independent transmitting and receiving branches are dynamically assigned in the radio system to transfer of signals between a base station and a mobile station so that adequate signal quality is obtained for as many subscribers as possible on each traffic channel and control channel. Dynamic assigning of transmitting and receiving branches may thus be utilized for locally increasing the network capacity. Consequently, the equipment configuration designed for maximum performance of the radio system can be employed as efficiently as possible when maximum performance is not required in the radio system. With the inventive radio system, signal transfer does not require too efficient an equipment configuration, but the transmitting and receiving branches not needed in the transfer of the signal in question can be used for transfer of other signals in the system. For transfer of each signal in the inventive adaptive radio system, at least the number of parallel transmitting and receiving branches required by the signal are connected. This dynamic assigning of transmitting and receiving branches creates antenna lobes that change as per connection, or as per timeslot or channel type in e.g. the TDMA system.

The invention is most advantageous when the mobile communications system is based on the time division principle and when the modulation transmit bandwidth may vary subscriber and/or channel specifically, for example in the so-called varying frequency band multirate system, as in the possible GSM/UMTS combination.

Such an adaptive radio system provides the advantage that the capacity of the base station can be increased without adding receivers or transmitters into the equipment. In such a case, the base station is able to serve more mobile subscribers at the same time.

Further, the inventive radio system provides the advantage that, if need be, a channel with better quality than normal can be offered connection specifically for some subscribers.

In addition, the inventive radio system provides the advantage of the system being reliable in equipment failure situations as the equipment can flexibly be reconfigured.

BRIEF DESCRIPTION OF THE DRAWINGS

In the following, the invention will be described in closer detail in connection with the preferred embodiments, with reference to the examples according to FIGS. 4a–10 in the accompanying drawings, in which.

DETAILED DESCRIPTION OF THE INVENTION

The present invention is applicable to any mobile communications system that uses SDMA technology. Below, the invention is described by way of example mainly in connection with the TDMA system, the pan-European digital GSM mobile communications system. FIG. 1 shows the simplified structure of the mobile communications system, described above. For those interested in a closer description of the GSM system, reference is made to the GSM Recommendations and "The GSM System for Mobile Communications", by M. Mouly & M. Pautet, Palaiseau, France, 1992, ISBN: 2-9507190-0-7.

In the following, the invention is described in greater detail in the light of its preferred embodiment, with reference to FIGS. 4a and 4b.

Figure 4A:
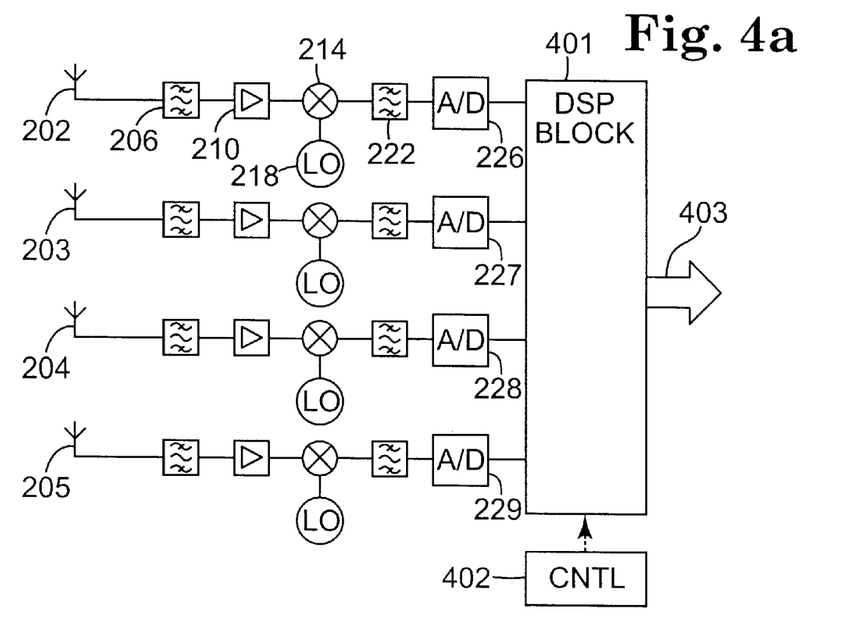

FIG. 4a shows an exemplary block diagram for the receiving section of a base station in the inventive adaptive radio system when the receiving section comprises four independent receiving branches. In FIG. 4a, the receiving branch blocks corresponding to the blocks in FIG. 2a described in the prior art description are denoted with the same reference numbers as in FIG. 2a. The block diagram of the receiving section according to the invention differs from the block diagram described in the prior art description as to the signal processing part and its control. The signal is received from the radio path with antennas 202–205, after which it is modified in blocks 206–226 of each receiving branch in the way described above in connection with the prior art description. The modified signal is conveyed to signal processing block 401 according to the present invention for processing. According to the present invention, control unit 402 controls signal processing block 401 comprising signal processing units known per se that can dynamically be connected to the receiving branches. Responsive to control by control unit 402, signal processing block 401 dynamically connects signal processing units to the receiving branches e.g. traffic channel and control channel specifically for e.g. parallel reception. Thus, signal processing block 401 in FIG. 4a comprises a number of signal processing units that are connected to the output of A/D converters 226–229 in the appropriate ways. Signal processing block 401 advantageously comprises as many signal processing units as there are receiving branches in the base station configuration, advantageously four in the case of FIG. 4a. The processed signal is conveyed from the signal processing units of signal processing block 401 to other parts of the base station along line 403.

Figure 4B:
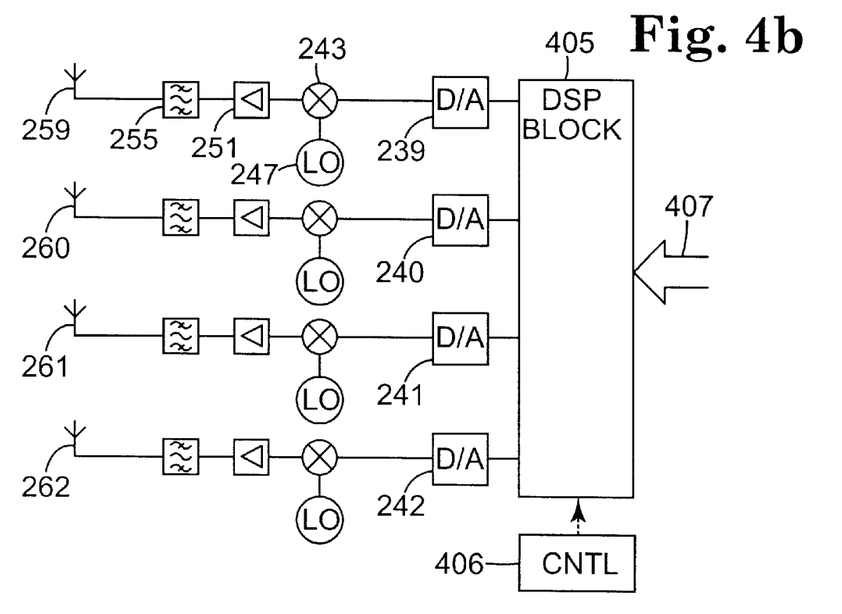

FIG. 4b shows an exemplary block diagram for the transmitting section of a base station in the inventive adaptive radio system when the transmitting section comprises four independent transmitting branches. In FIG. 4b, the blocks corresponding to the blocks in FIG. 2b are denoted with the same reference numbers. The block diagram of the transmitting section according to the invention differs from the prior art structure as to the signal processing part and its control. The transmitted signal is conveyed from other parts of the base station along line 407 to the inventive signal processing block 405 comprising signal processing units known per se. Signal processing block 405 is controlled with control unit 406 to form the desired connection between the signal processing units and D/A converters 239–242. The required number of transmitting branches are connected to e.g. the traffic channels and the control channels. The transmitted signal is modified in blocks 239–255 of the transmitting branches as described above in connection with the prior art, and transmitted to the radio path via antennas 259–262. Signal processing block 405 advantageously comprises as many signal processing units as there are transmitting branches in the base station configuration, advantageously four in the case of FIG. 4b.

In the other embodiments of the invention, the functionality according to the invention can be carried out by means of e.g. combined transmitting and receiving antenna elements and/or a combined signal processing block at the transmitting and receiving section and associated control.

Figure 5A:
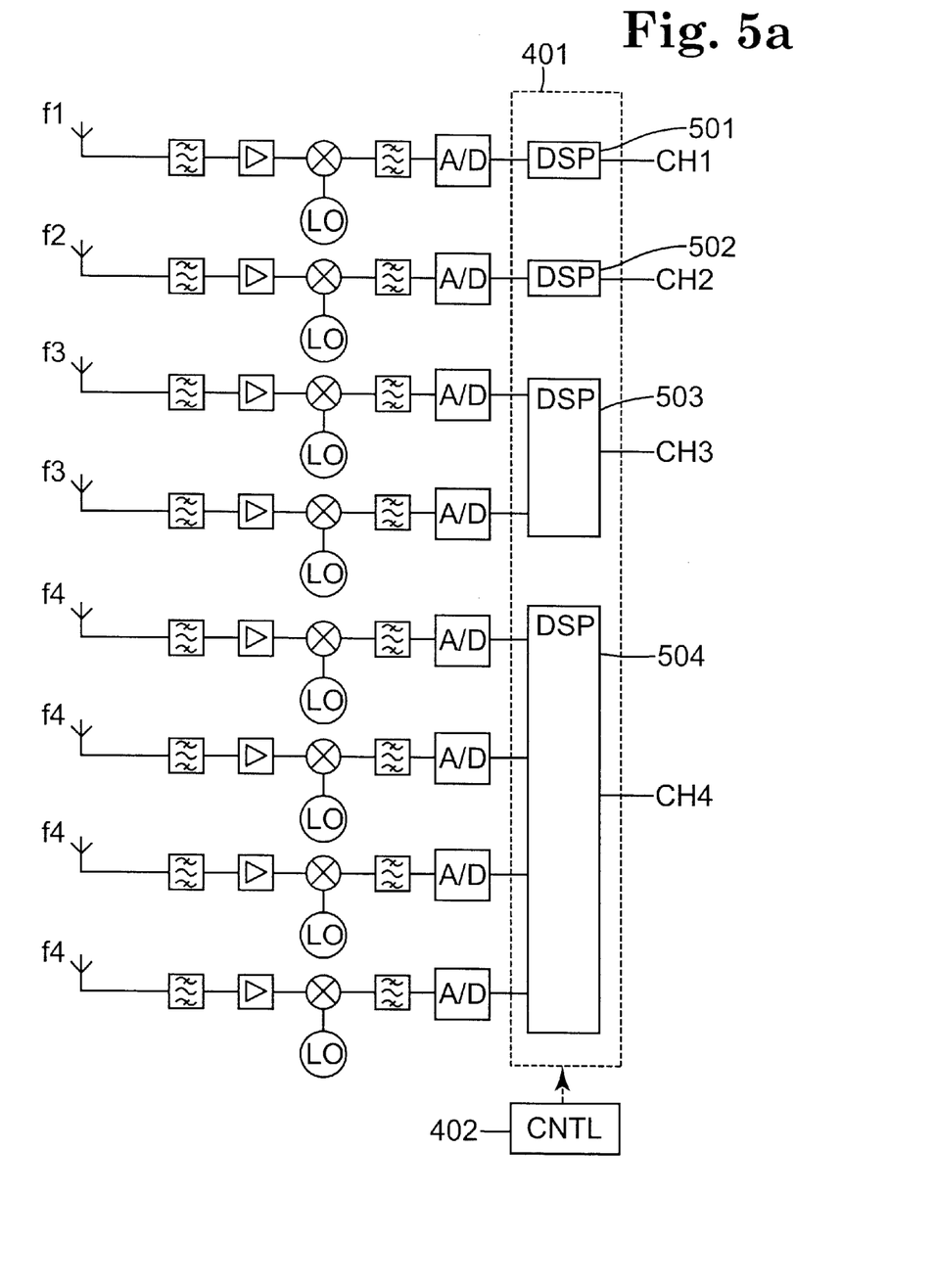
FIGS. 5a and 5b show an exemplary implementation of a transmitting and receiving configuration of a radio system according to the preferred embodiment of the invention in a TDMA system timeslot.
Figure 5B:
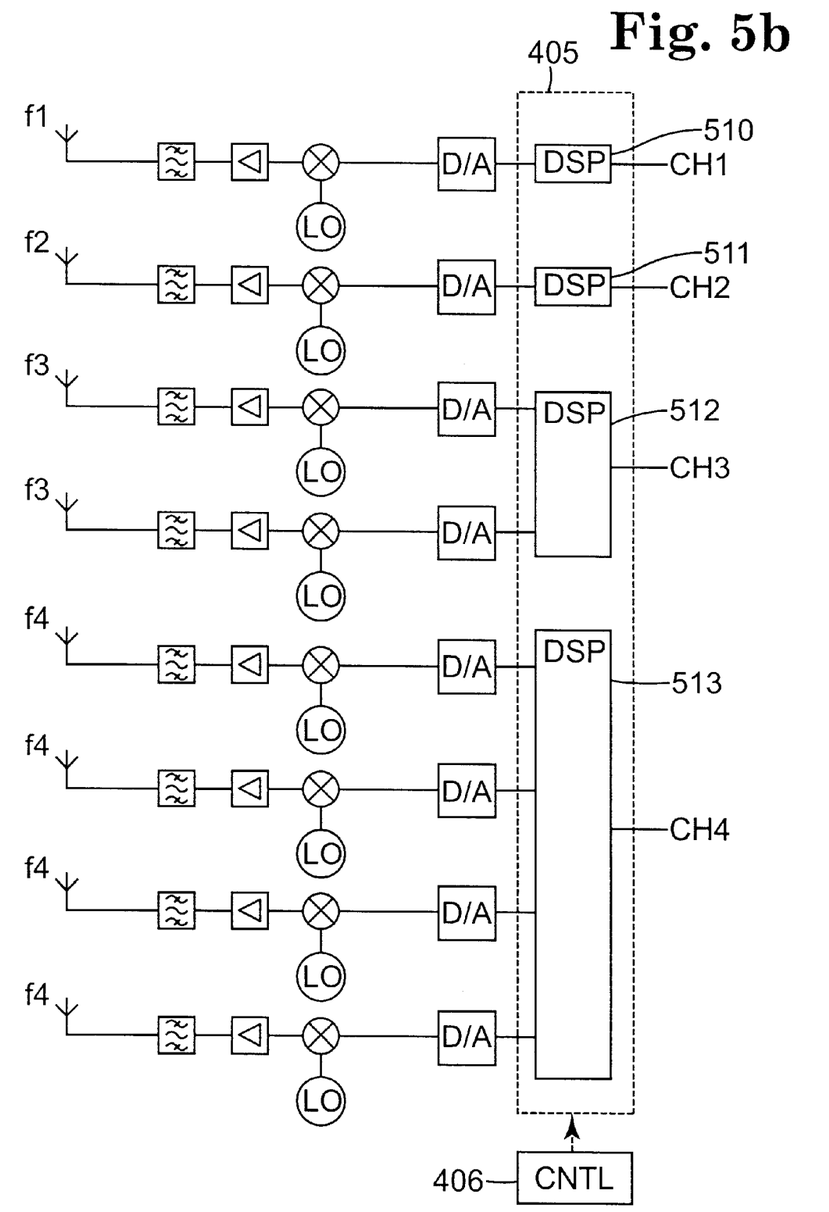

FIGS. 5a and 5b illustrate an exemplary embodiment of the preferred embodiment of the invention in one timeslot of the TDMA system when the base station has eight independent transmitting and receiving branches. In this exemplary case, the signal processing units comprised by the signal processing blocks 401 and 405 of FIGS. 4a and 4b are connected, under control of control units 402 and 406, to the transmitting and receiving branches of the base station so that two branches are connected separately each to its own signal processing unit 501, 502 and 510, 511, two parallel branches are connected to one signal processing unit 503 and 512, and four parallel branches are connected to signal processing unit 504 and 513. Single transmitting and receiving branches are tuned to frequencies f1 and f2, two parallel branches to frequency f3, and four parallel branches to frequency f4. With the configuration of FIGS. 5a and 5b, the base station is able to provide service to four mobile subscribers in one timeslot, at least with the quality of service required by each of the subscribers. Hence, the inventive functionality has increased the number of subscribers to whom service is provided in comparison to the prior art where just one subscriber could be served with good quality of service.

Figure 6:
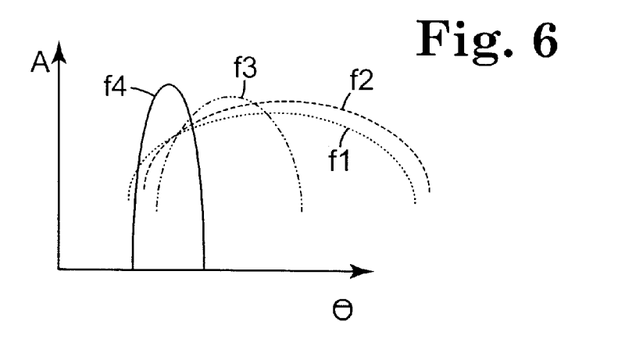
FIG. 6 shows the radiation patterns of a base station equipment configuration according to FIGS. 5a and 5b.

FIG. 6 shows the directional patterns of the antennas illustrated in the exemplary case of FIGS. 5a and 5b, with the horizontal axis indicating the direction angle Θ and the vertical axis indicating amplitude A. The directional patterns of the single element antenna denoted with frequencies f1 and f2 in FIG. 6 spread out to wide azimuth at low amplitude. The directional pattern of an antenna array consisting of two antenna elements of two parallel receiving branches is denoted with frequency f3 in the figure, and the directional pattern of an antenna array consisting of four antenna elements of four parallel receiving branches is denoted with frequency f4. The figure shows that the antenna lobe becomes narrower and the amplitude of the main radiation direction increases as the number of antenna elements is increased.

Figure 7:
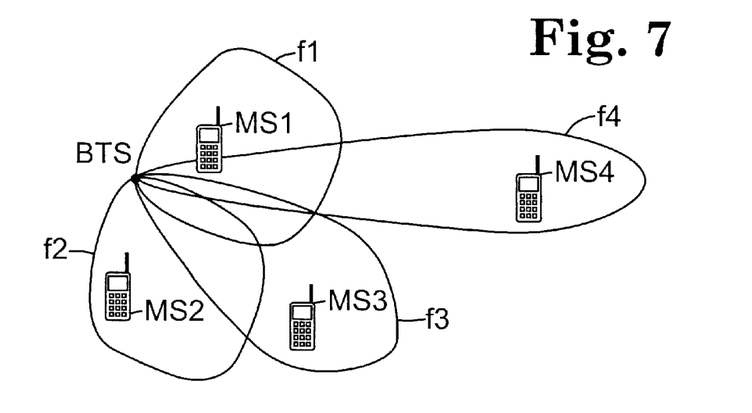
FIG. 7 shows the antenna lobes of the base station equipment according to FIGS. 5a and 5b as base station coverage areas.

FIG. 7 shows the directional patterns of FIG. 6 as coverage areas of the base station BTS. The wide and short-range coverage areas of frequencies f1 and f2 are suitable for giving service to mobile stations MS1 and MS2 located close to the base station. The antenna lobe of frequency f3 can be used to give service to mobile station MS3 somewhat further away, and the antenna lobe of frequency f4, beamed to a narrow geographical area, can be used to provide service to mobile station MS4 located far away from the base station BTS.

Figure 8A:
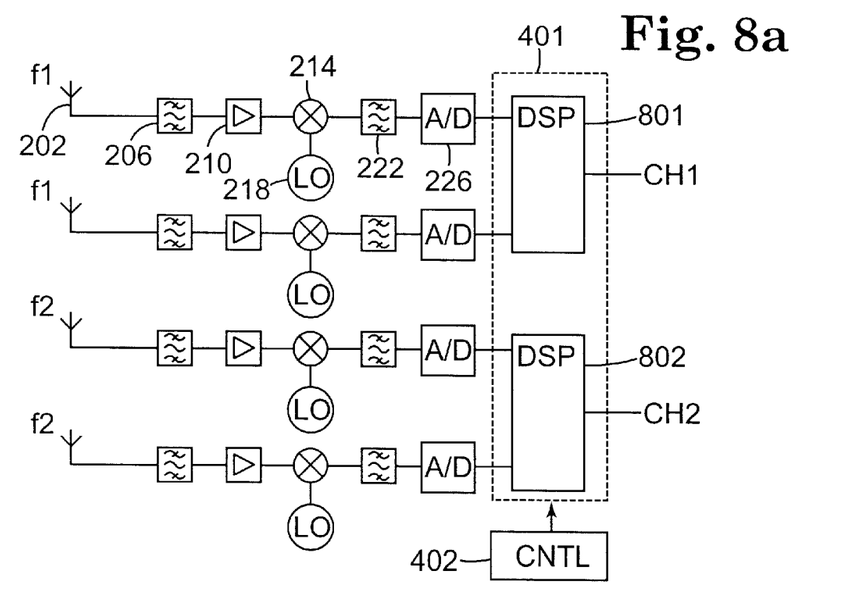
FIGS. 8a and 8b show a second exemplary implementation of a transmitting and receiving configuration of a radio system according to the preferred embodiment of the invention in a TDMA system timeslot.
Figure 8B:
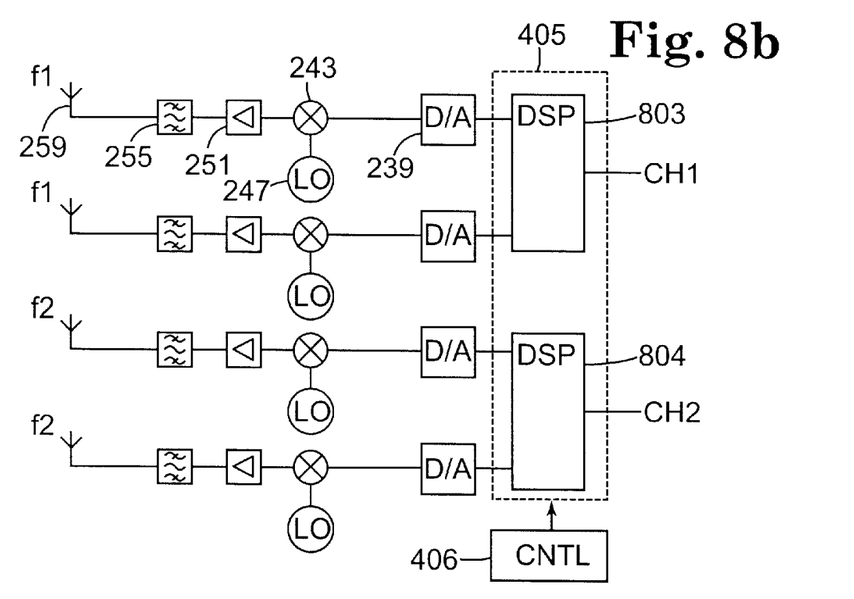

FIGS. 8a and 8b show a second exemplary embodiment of the preferred embodiment of the invention in one timeslot of the TDMA system when the base station has four independent transmitting and receiving branches. In the exemplary case of FIG. 8a, two parallel receiving branches are connected to one signal processing unit 801. These receiving branches are tuned to radio frequency f1. The other two parallel receiving branches are connected to a second signal processing unit 802 and tuned to radio frequency f2. Correspondingly in the exemplary case of FIG. 8b, two parallel transmitting branches are connected to one signal processing unit 803. These transmitting branches are tuned to radio frequency f1. The other two parallel transmitting branches are connected to a second signal processing unit 804 and tuned to radio frequency f2.

Figure 9:
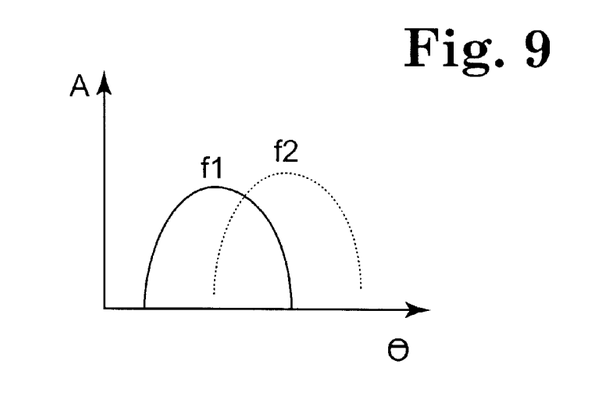
FIG. 9 shows the radiation patterns of a base station equipment configuration according to FIGS. 8a and 8b.

FIG. 9 shows the directional patterns of the antennas illustrated in the exemplary case of FIGS. 5a and 5b, with the horizontal axis again indicating the direction angle Θ and the vertical axis indicating amplitude A. The directional patterns of the antenna arrays consisting of two antenna elements of frequencies f1 and f2 are similar.

Similarly to what has been described above in the exemplary cases, the configuration of the adaptive radio system according to the invention is dynamically connected e.g. timeslot or hash code specifically so that the transmitting and receiving branches in parallel connection result in the desired antenna lobe pattern and cellular coverage. The four parallel receiving and transmitting branches of the base station can, for example, be tuned each to its own channel CH1–CH4 on frequencies f1–f4, whereby the configuration thus establishes four independent transmitting and receiving branches that simultaneously handle e.g. four different connections between the base station BTS and the mobile station MS.

The dynamic parallel connection of transmitting and receiving branches according to the invention is applicable for use with different kinds of control criteria. Such control criteria include e.g. signal quality, channel width, network capacity and/or channel type. The control criteria may be conveyed each separately or in suitable combinations. The next examines in closer detail how to apply the exemplary criteria mentioned above to the functionality of the invention.

Signal quality can be measured with the aid of e.g. the received signal strength, bit error ratio BER or signal-to-noise ratio. Thus, the quality of the signal transmitted by the mobile station can be measured at the base station, and the required quality can be determined for the signal, for example based on the service being used. Then, the inventive adaptive radio system is employed to assign a suitable number of parallel transmitting and receiving branches to the mobile station connection in question, to achieve at least the required signal quality on the connection. In such a case, the adaptive radio system of the invention is employed to adapt to the connection quality.

The dynamic assigning of transmitting and receiving branches on the basis of channel width is based on the transmission having less energy per bit as a result of the higher than average bit rate of a wide channel, which results in that the range of a wide channel transmission is smaller than average. To compensate for this, it is possible in the inventive adaptive radio system to assign several transmitting and receiving branches to such a wide channel transmission e.g. an UMTS transmission, whereby as a result of a narrower antenna lobe and higher antenna gain the signal strength is increased and the disturbances to beyond the antenna lobe are decreased. Alternatively, the use of several transmitting and receiving lines can provide an advantage by means of diversity reception processing. In a similar way, narrowband signal transfer may be assigned e.g. just one or a few transmitting and receiving branches.

Figure 10:
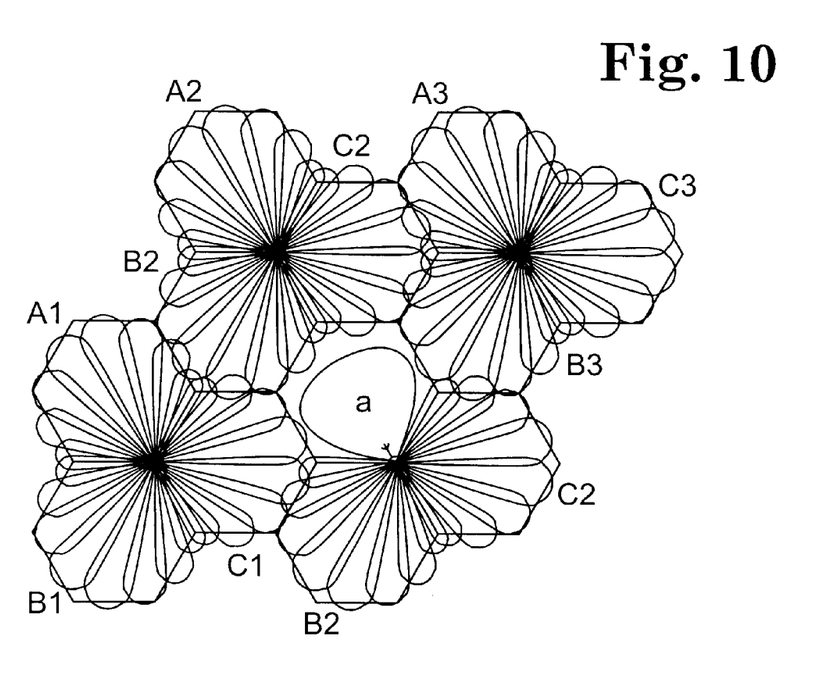
FIG. 10 shows, as a cellular structure, the capacity improvement of one cell in the inventive radio system.

FIG. 10 shows a cellular structure in which the inventive adaptive radio system has locally increased the network capacity. Each hexagon in the figure represents one cell of the base station, each having eight transmitting and receiving branches and thus also eight antenna elements. In the majority of the cells, prior art SDMA technology has been employed to connect all eight antenna elements as one antenna array whose narrow antenna lobe is directed to covers the cell service area. The antenna lobe is beamed to the mobile station being served with any prior art method. The cells use one frequency A1, A2, A3, B1, B2, B3, C1, C2, or C3 and thus a limited number of channels for communication. If at one point in the network more capacity is required than one frequency is able to provide, it is possible in the inventive adaptive radio system in the cell in question to dynamically assign less transmitting and receiving branches per frequency whereby it is possible to begin using more frequencies in the cell, as is done in one cell a of FIG. 10. In this cell a, for example three frequencies, A1, A2 and A3 can be brought into use and to assign the available eight transmitting and receiving branches among these as is appropriate. As a result, the channel capacity in cell a is tripled and the network services can be offered to subscribers more reliably and more widely. As the figure indicates, the antenna lobe in cell a becomes wider due to this local arrangement, but because an antenna array of eight antenna elements is still in use in the other cells, this arrangement does not result in any additional disturbance in the network. When the capacity requirement in cell a again decreases to the previous level, the transmitting and receiving branches can e.g. again be tuned to the same frequency and all eight antenna elements can be used to form the antenna array's narrow scanning antenna lobe. Thus, the adaptive radio system according to the invention can be employed to locally increase the system capacity without adding transmitters or receivers into the equipment configuration of the base station.

In dynamic assigning of transmitting and receiving branches, the channel type bears significance in that its is advantageous to assign only one transmitting branch to control channels in the downlink direction, because the control channel has no backward channel in the uplink direction and thus the location of the mobile station cannot be determined which results in that the antenna lobe cannot accurately be directed towards the mobile station. In such an event, one of the base station antenna elements is assigned to control channel transmission on the control channel frequency and timeslot. Thus, transmitting and receiving branches can dynamically be assigned to traffic channels in the inventive adaptive radio system, on the basis of e.g. one of the above criterion, and only one transmitting branch to unidirectional control channels and therefore only one antenna element.

The adaptive radio system according to the present invention offers a flexible way of assigning transmitting and receiving branches to signal transfer as need be, and thus of increasing the network capacity. In an adaptive radio system, the equipment configuration of base stations is still designed according to the maximum performance required of the network, and based on how many narrowband channels the base station must simultaneously be able to provide. Dynamic assigning of an equipment configuration thus designed according to the invention, for example to different services and different subscribers, will improve the performance of the equipment when no maximum load condition is present in the network.

The drawings and the description relating thereto are only intended to illustrate the idea of the invention. The adaptive radio system according to the invention may vary in details within the scope of the claims. Although the invention is in the above mainly described in connection with adaptive antennas of a base station, it is applicable for use with other adaptive antennas as well, for example in a mobile station. The invention is above described by way of example in connection with a TDMA time division multiple access system, and it is obvious that the invention is also applicable for use with systems implemented with other multiple access technologies, for example in CDMA systems. The invention may also be used in WLL systems (Wireless Local Loop). In this application, a mobile station and a base station generally refer to the terminal equipment of the subscriber and a network unit capable of forming a radio link with it, such as the terminal and fixed part of a wireless system.

What is claimed is:

1. An adaptive radio system comprising:
a plurality of mobile stations and at least one base station, at least the base station in the radio system having a plurality of independent transmitting and receiving branches for transfer of signals between the base station and mobile stations, said radio system including first device for connecting said transmission branches and receiving branches in parallel,
wherein in that the radio system additionally includes second device for determining, on the basis of predetermined criteria, the number of parallel transmission and receiving branches to be allocated for a single signal, said second device controlling said first device for dynamically allocating a certain number of parallel transmission and receiving branches to transfer a single signal.

2. The radio system as claimed in claim 1, wherein the first device include a signal processing block for processing the signals of the transmitting branches and receiving branches, and the second device include control means for controlling the signal processing block to connect signal processing of one or more parallel transmitting or receiving branches in parallel.

3. The radio system as claimed in claim 2, wherein the control device is responsive to the quality of the transferred signal.

4. The radio system as claimed in claim 2, wherein the control device is responsive to the channel width of the transferred signal.

5. The radio system as claimed in claim 2, wherein the control device is responsive to the load on the radio network.

6. The radio system as claimed in claim 2, wherein the control device is responsive to the channel type used for the signal transfer.

7. The radio system as claimed in claim 1, wherein the radio system couples the transmitting and receiving branches of the base station in parallel and for numerical, dynamic assigning thereof to a plurality of simultaneous, independent connections for transfer of signals between the base station and mobile stations.

8. The radio system as claimed in claim 7, wherein said simultaneous connections are on different frequencies.

9. A method for assigning transmitting and receiving branches in a radio system comprising:
   transferring signals between a plurality of mobile stations and at least one base station, at least the base station in the radio system having a plurality of independent transmitting and receiving branches for transfer of the signals between the base station and mobile stations, wherein
      determining the number of transmitting and receiving branches to be allocated to signal transfer between a base station and a mobile station, and
      assigning a number of said transmitting and receiving branches to transfer of a single signal between a base station and a mobile station on the basis of the determination, said number changing dynamically depending on the signal.

10. The method as claimed in claim 9, wherein signal quality of a connection between the base station and a mobile station is determined and the signal quality required by the connection is determined, and wherein assigning at least such a number of transmitting and receiving branches to the connection, wherein the required signal quality on the connection is obtained.

11. The method as claimed in claim 9, wherein assigning, on the basis of the channel width used, such a number of transmitting and receiving branches to a connection between the base station and a mobile station, by means of which an adequate signal quality on the connection is obtained.

12. The method as claimed in claim 9, wherein reducing a number of parallel transmitting and receiving branches assigned to a connection between the base station and a mobile station when a network load exceeds a preset threshold level.

13. The method as claimed in claim 9, wherein transmitting and receiving branches are assigned connection-specifically to a traffic channel, and individually to a control channel, the number of the branches being at least that required by each service.

14. The method as claimed in claim 13, wherein assigning transmitting and receiving branches timeslot-specifically.

15. The method as claimed in claim 13, wherein assigning transmitting and receiving branches hash code specifically.

16. The method as claimed in claim 13, wherein assigning one transmitting branch to the control channel.

17. The method as claimed in claim 9, wherein numerical, dynamic assigning of transmitting and receiving branches of the base station to a plurality of simultaneous, independent connections between the base station and mobile stations.

18. The method as claimed in claim 17, wherein numerical, dynamic assigning of transmitting and receiving branches of the base station to a plurality of simultaneous connections between the base station and mobile stations, wherein connections are on different frequencies.

* * * * *